US007903721B2

(12) United States Patent
Kuchibhotla et al.

(10) Patent No.: US 7,903,721 B2
(45) Date of Patent: Mar. 8, 2011

(54) ALLOCATION OF CONTROL CHANNEL FOR RADIO RESOURCE ASSIGNMENT IN WIRELESS COMMUNICATION SYSTEMS

(75) Inventors: Ravi Kuchibhotla, Gurnee, IL (US);
Brian K. Classon, Palatine, IL (US);
Robert T. Love, Barrington, IL (US);
Ravikiran Nory, Grayslake, IL (US);
Kenneth A. Stewart, Grayslake, IL (US); Yakun Sun, Evanston, IL (US);
Michael E. Buckley, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 12/858,155

(22) Filed: Aug. 17, 2010

(65) Prior Publication Data
US 2010/0309891 A1 Dec. 9, 2010

Related U.S. Application Data (63) Continuation of application No. 11/538,771, filed on Oct. 4, 2006, now Pat. No. 7,778,307.

(51) Int. Cl.
*H04B 1/00* (2006.01)

(52) U.S. Cl. ......... 375/146; 375/260; 375/295; 370/321; 370/345; 370/437; 370/478

(58) Field of Classification Search .................. 375/141, 375/146, 260, 295; 370/319, 321, 336, 337, 370/345, 437, 465, 478
See application file for complete search history.

(56) References Cited

U.S. PATENT DOCUMENTS

| | | | |
|---|---|---|---|
| 4,491,947 A | 1/1985 | Frank | |
| 5,099,511 A | 3/1992 | Matsumoto | |
| 6,031,826 A | 2/2000 | Hassan | |
| 6,097,772 A | 8/2000 | Johnson et al. | |
| 6,243,580 B1 | 6/2001 | Garner | |
| 6,252,910 B1 | 6/2001 | West et al. | |
| 6,347,391 B1 | 2/2002 | Uesugi et al. | |
| 6,549,772 B1 | 4/2003 | Chavez et al. | |
| 6,574,211 B2 | 6/2003 | Padovani et al. | |
| 6,697,422 B1 | 2/2004 | Mathai | |
| 6,751,187 B2 | 6/2004 | Walton et al. | |

(Continued)

FOREIGN PATENT DOCUMENTS

EP 1638271 A1 3/2006

(Continued)

OTHER PUBLICATIONS

3rd Generation Partnership Project 2 "3GPP2"; 3GP2 X.S0022-A; Version 0.0; Date: TBD; Broadcast and Multicast Service in CDMA2000 Wireless IP Network; Revision A; 138 pages.

(Continued)

*Primary Examiner* — Dac V Ha
(74) *Attorney, Agent, or Firm* — Roland K. Bowler, II (57) ABSTRACT

A wireless communication device for receiving a frame corresponding to a transmission time interval, the frame having a control channel including at least two control channel elements and an embedded bit sequence, the location of which indicates a portion of the control channel used for radio resource assignment, wherein the portion of the control channel used for radio resource assignment may be less than the entire control channel of the frame having the embedded bit sequence, and wherein the at least two frames may use different portions of the control channel for radio resource assignment.

6 Claims, 4 Drawing Sheets

U.S. PATENT DOCUMENTS

| | | |
|---|---|---|
| 6,934,275 B1 | 8/2005 | Love et al. |
| 7,016,319 B2 | 3/2006 | Baum et al. |
| 7,200,405 B2 | 4/2007 | Rudolf et al. |
| 7,664,091 B2 | 2/2010 | Batariere et al. |
| 2002/0029229 A1 | 3/2002 | Jakopac et al. |
| 2002/0032030 A1 | 3/2002 | Berglund et al. |
| 2002/0114401 A1 | 8/2002 | Kim et al. |
| 2002/0183066 A1 | 12/2002 | Pankaj |
| 2003/0032030 A1 | 2/2003 | Prolla et al. |
| 2003/0112778 A1 | 6/2003 | Lundby |
| 2004/0082333 A1 | 4/2004 | Ito et al. |
| 2004/0116143 A1* | 6/2004 | Love et al. .................. 455/522 |
| 2005/0025101 A1 | 2/2005 | Paneth et al. |
| 2005/0147078 A1 | 7/2005 | Arima et al. |
| 2005/0254442 A1 | 11/2005 | Proctor, Jr. et al. |
| 2006/0050742 A1 | 3/2006 | Grandhi et al. |
| 2006/0072520 A1 | 4/2006 | Chitrapu et al. |
| 2006/0146756 A1* | 7/2006 | Wang et al. .................. 370/335 |
| 2007/0025345 A1* | 2/2007 | Bachl et al. .................. 370/389 |
| 2007/0025468 A1 | 2/2007 | Li |
| 2007/0047474 A1 | 3/2007 | Anderson |
| 2007/0110104 A1 | 5/2007 | Sartori et al. |
| 2007/0165731 A1 | 7/2007 | Xiao et al. |
| 2008/0040105 A1 | 2/2008 | Wang et al. |
| 2008/0062912 A1 | 3/2008 | Tiedemann, Jr. et al. |
| 2008/0084853 A1 | 4/2008 | Kuchibhotla et al. |
| 2008/0085718 A1 | 4/2008 | Kuchibhotla et al. |
| 2008/0232291 A1 | 9/2008 | Hus et al. |

FOREIGN PATENT DOCUMENTS

| | | |
|---|---|---|
| WO | 2005050852 A2 | 6/2005 |

OTHER PUBLICATIONS

Scalable OFDMA Physical Layer in IEEE 802.16 Wirelessman; Intel Technology Journal; Aug. 20, 2004; 14 pages.

Harri Holma, Antti Toskala; WCDMA for UMTS; 2000, Wiley and Sons; XP002537677; pp. 95-97.

3GPP TSG Ran WG1 Ad Hoc on LTE; R1-050590; Sophia Antipolis, France; Jun. 20-21, 2005; 24 pages.

3GPP TSG RAN 1#44; R1-060378; Denver, USA; Feb. 13-17, 2006; 7 pages.

* cited by examiner

ALLOCATION OF CONTROL CHANNEL FOR RADIO RESOURCE ASSIGNMENT IN WIRELESS COMMUNICATION SYSTEMS

CROSS REFERENCE TO RELATED APPLICATIONS

The present application is continuation of commonly assigned U.S. application Ser. No. 11/538,771 filed on 4 Oct. 2006, now U.S. Pat. No. 7,778,307, the contents of which are fully incorporated herein by reference and from which benefits are claimed under 35 U.S.C. 120.

FIELD OF THE DISCLOSURE

The present disclosure relates generally to wireless communications and, more particularly, to controlling channel signaling for shared channels in wireless communication systems, for example, in cellular communication networks, corresponding entities and methods.

BACKGROUND

Time division multiplexing (TDM) and frequency division multiplexing (FDM) methods, including hybrids thereof, have been proposed in addition to separate and joint coding of control channel signaling for scheduling downlink data transmission in the Long Term Evolution (LTE) of Universal Mobile Telecommunications System Terrestrial Radio Access Network (UTRAN) specifications. In TDM and FDM transmissions of control channel signaling, the control information for downlink and uplink assignments may be transmitted over the first few symbols of the downlink frame or it may be spread out over the length of the frame. The frame duration is approximately 0.5 ms, though other durations are also possible.

The various aspects, features and advantages of the disclosure will become more fully apparent to those having ordinary skill in the art upon careful consideration of the following Detailed Description and the accompanying drawings described below. The drawings may have been simplified for clarity and are not necessarily drawn to scale.

DETAILED DESCRIPTION

Figure 1:
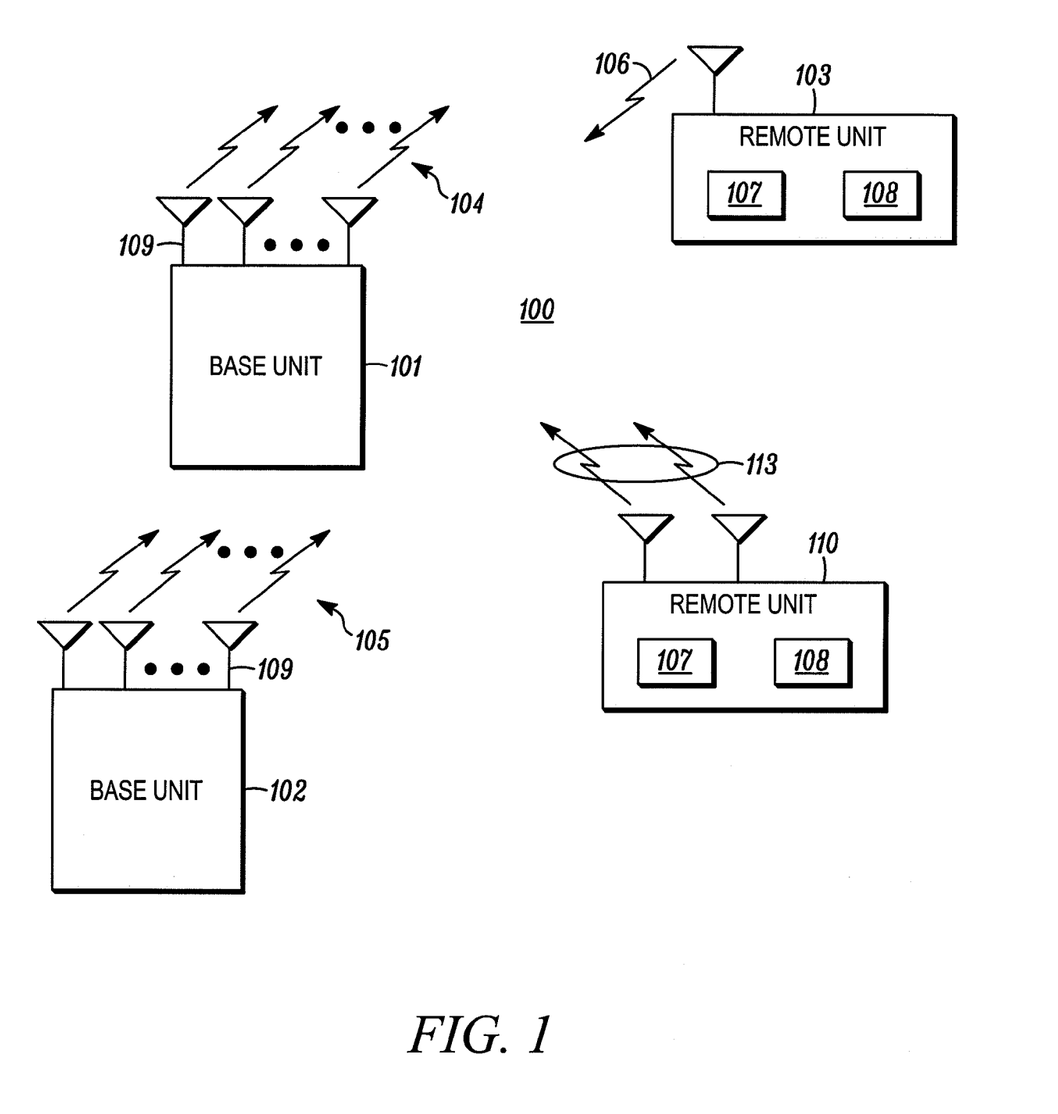
FIG. 1 illustrates a wireless communication system.

FIG. 1 illustrates a wireless communication system 100 comprising multiple cell serving base units forming a network distributed over a geographical region. A base unit may also be referred to as an access point, access terminal, Node-B, or by other terminology known in the art. The one or more base units 101 and 102 serve a number of remote units 103 and 110 within a serving area or cell or within a sector thereof. The remote units may also be referred to as subscriber units, mobile units, users, terminals, subscriber stations, user equipment (UE), user terminals or by other terminology known in the art. The network base units communicate with remote units to perform functions such as scheduling the terminals to receive or transmit data using available radio resources. The wireless network also comprises management functionality including data routing, admission control, subscriber billing, terminal authentication etc., which may be controlled by other network entities, as is known generally by those having ordinary skill in the art.

Base units 101 and 102 transmit downlink communication signals 104 and 105 to remote units on at least a portion of the same resources (time and/or frequency). Remote units 103 and 110 communicate with one or more base units 101 and 102 via uplink communication signals 106 and 113. The one or more base units may comprise one or more transmitters and one or more receivers that serve the remote units. The number of transmitters at the base unit may be related, for example, to the number of transmit antennas 109 at the base unit. When multiple antennas are used to serve each sector to provide various advanced communication modes, for example, adaptive beam-forming, transmit diversity, transmit SDMA, and multiple stream transmission, etc., multiple base units can be deployed. These base units within a sector may be integrated and may share various hardware and software components. For example, all base units co-located to serve a cell can constitute what is traditionally known as a base station. The remote units may also comprise one or more transmitters and one or more receivers. The number of transmitters may be related, for example, to the number of transmit antennas at the remote unit.

In one embodiment, the communication system utilizes OFDMA or a next generation single-carrier based FDMA architecture for uplink transmissions, such as interleaved FDMA (IFDMA), Localized FDMA (LFDMA), DFT-spread OFDM (DFT-SOFDM) with IFDMA or LFDMA. In other embodiments, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and frequency division multiplexing/multiple access techniques.

Generally, a wireless communication network infrastructure scheduling entity located, for example, at each base unit 101 and 102 in FIG. 1, allocates or assigns radio resources to remote units in the network. The base units each include a scheduler for scheduling and allocating resources to remote units in corresponding serving areas or cells or sectors. In multiple access schemes such as those based on OFDM methods and the long term evolution of UTRA/UTRAN Study Item in 3GPP (also known as evolved UTRA/UTRAN (EU-TRA/EUTRAN)), scheduling may be performed in the time and frequency domains using a Frequency Selective (FS) scheduler. In some embodiments, each remote unit may provide a frequency band channel quality indicator (CQI) or other metric to the scheduler to enable scheduling.

In OFDM systems or OFDM like systems, such as DFT-SOFDM and IFDMA, a resource allocation is a frequency and time allocation that maps information for a particular base unit to sub-carrier resources from a set of available sub-carriers as determined by the scheduler. This allocation may depend, for example, on the frequency-selective channel-quality indication (CQI) or some other metric reported by the UE to the scheduler. The channel-coding rate and the modulation scheme, which may be different for different portions of the sub-carrier resources, are also determined by the scheduler and may also depend on the reported CQI or other metric. In code division multiplexed networks, the resource allocation is a code allocation that maps information for a particular base unit to sub-carrier resources from a set of available sub-carriers as determined by the scheduler.

Figure 2:
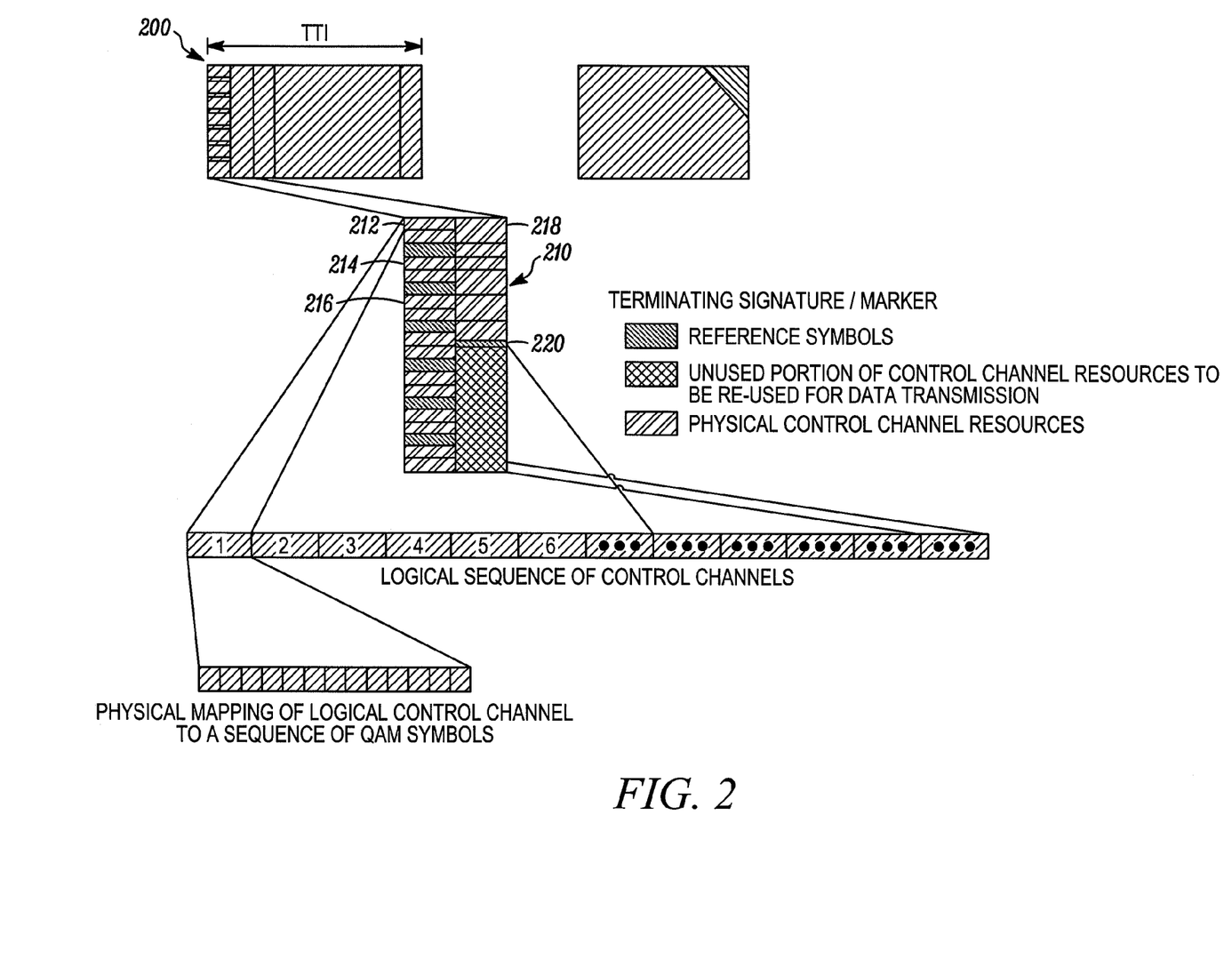
FIG. 2 illustrates a radio frame comprising a composite control channel having a plurality of control channel elements.

FIG. 2 illustrates a frame 200 that constitutes a portion of a radio frame. The radio frame generally comprises a plurality of frames, which may form a concatenated continuum of frames. In FIG. 2, each frame includes a composite control channel portion 210 comprising at least two control channel elements. FIG. 2 illustrates the composite control channel including a plurality of control channel elements 212, 214, 216 and 218. The control channel elements each comprise a codeword that provides a physical mapping of a logical control channel to a sequence of symbols, for example, QAM symbols. The control channel elements are generally not of the same type. In FIG. 2, for example, control channel elements 212 and 218 have different sizes. Control channel elements may also be for uplink or downlink assignments and have different associated information payloads. Control channel elements may also be associated with different releases of the wireless communication protocol specification. In some embodiments, the composite control channel includes reference symbols, for example, pilot symbols, that are distinct from the control channel elements. The reference symbols are typically read by all remote units.

Each frame corresponds to a transmission time interval (TTI). An exemplary TTI is 1 ms. In one embodiment, a single TTI has a length 1 ms or 2 ms wherein the TTI is segmented into two sub-frames each having a 0.5 ms length. Such a construction however implies the need to address multiple resource blocks, i.e., more than the number of resource blocks in a single 0.5 ms sub-frame, unless the resource block (RB) definition is expanded to automatically define the RB as extending over the entire length of the TTI, without regard for the TTI duration. This can lead to inefficiency, however, in the form of excessive per-RB capacity. In case the RB is defined to extend over a fraction of the length of the TTI, it would be possible to independently address each of the resource blocks in the multiple sub-frames making up the TTI. Accordingly mechanisms are required to signal resource assignments in the case of a frame or TTI composed of concatenated sub-frames. Furthermore, mechanisms are required to be able to assign resources based on the needs of individual UE wherein fewer resources being assigned for a UE served smaller packets while more resources are assigned to UE served with larger packets. In the case of Universal Mobile Telecommunications System (UMTS), a TTI is defined as the length of time over which a transmission or transport block is transmitted. A transmission block or transport block is composed of a block of jointly coded data protected by a single CRC. In the present instance, an alternative definition of TTI could be the length of transmission controlled by a single instance of control channel signaling.

In one embodiment, each control channel element contains only radio resource assignment information, for example, a codeword, exclusively addressed to a single wireless communication entity, for example, one of the remote units 103, 110 in FIG. 1. The radio resource assignment information includes, among other remote unit specific information, a time-frequency radio resource assignment. In other embodiments, the radio resource assignment information may additionally comprise modulation, code rate, information block size, antenna mode indicator, and other information.

In one embodiment, the wireless communication network infrastructure entity, for example, the scheduler, may address more than one control channel element to the same wireless communication entity, for example, one of the remote units 103 or 110 in FIG. 1. More particularly, the control channel may include a first version of a codeword including a resource assignment on a first control channel element of the composite control channel and a second version of the codeword including a resource assignment on a second control channel element of the composite control channel, wherein both of the first and second versions of the codeword are addressed to the same mobile unit. In one embodiment, the first and second versions of the codeword are the same, and in another embodiment the first and second versions of the codeword are different. Whether codewords addressed to the same entity are different or the same affects how the addressed entity combines the control channel elements as discussed further below. Thus the wireless communication network infrastructure entity transmits the composite control channel including at least two control channel elements, wherein each element includes corresponding first and second codeword versions addressed to the same entity. In some instances, the wireless network infrastructure entity may, typically based on the channel conditions of the entity, transmit the composite control channel including a single control channel element addressed to the entity.

Figure 3:
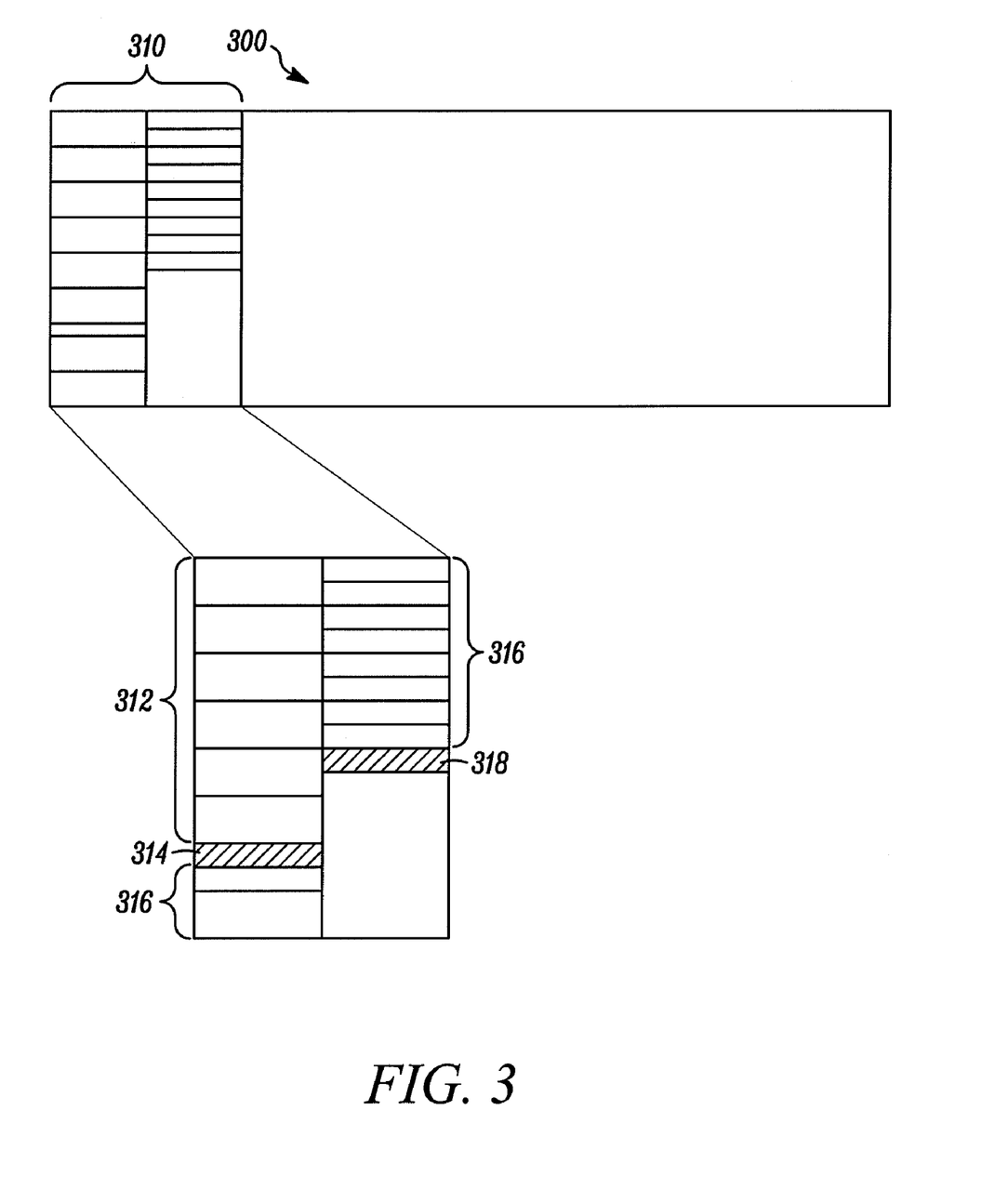
FIG. 3 illustrates a composite control channel having different control channel element types.

In embodiments where the composite control channel includes a composite control channel including at least two different types of radio resource assignment control channel elements, the remote unit generally determines the number of types of control channel elements constituting the composite control channel upon receiving the composite control channel. In one embodiment, the composite control channel includes type indicator information for each type of control channel element constituting the composite control channel. The remote unit may thus determine the number of types of control channel elements based on the type of indicator information. In FIG. 3, a radio frame 300 includes a composite control channel 310 comprising a first control channel element type 312 and a second control channel element type 316. The first control channel element type is identified by a first indicator, for example, a sequence of bits, 314 appended to a last control channel element of the first type. The second control channel element type is identified by a second indicator 318 appended to a last control channel element of the second type. In another embodiment, the indicators 316 and 318 are not present, and the control channel element type is determined after successful decoding of the control element. For example, a type bit may indicate an uplink or downlink control channel element in the decoded payload. The control element may be addressed to a single UE by a color coded CRC or by other means. According to another aspect of the disclosure, the remote unit determines a number of control channel elements constituting at least one or at least two control channel elements of the composite control channel. FIG. 3 is only one illustrative embodiment of the physical layout of the control channel elements on the radio-sub frame. In an alternate embodiment, the layout may be viewed as a logical layout, where the control channel elements comprise a number of sub-carriers distributed across the frame.

In one embodiment, determining the number of types of control channel elements constituting the composite control channel includes determining a number of uplink control channel elements and determining a number of downlink control channel elements. The number of uplink control channel elements may be determined based on a first sequence of bits and the number of downlink control channel elements may be determined based on a second sequence of bits embedded within the frame. In one embodiment, the numbers of uplink and down link control channel elements are determined based on where the first and second bit sequences are embedded within the frame. Alternatively, the use of different bit sequences may be used to indicate the different numbers of control channel elements. For example, a first bit sequence may indicate a first number of uplink elements and a second bit sequence may indicate a second number of uplink elements.

In some embodiments, the composite control channel includes a first composite control channel portion in a first receive bandwidth on a first center frequency and a second composite control channel in a second receive bandwidth on a second center frequency. Such a control channel structure may be implemented to accommodate remote users having limited receive bandwidth. More generally, the composite control channel may be divided into multiple composite control channel portions on corresponding center frequencies. For example, terminals may have their receiver bandwidths limited to 10 MHz, while the carrier bandwidth is 20 MHz. In order accommodate such terminals of limited minimum bandwidth capability, it might be necessary to map the composite control channel to both the lower 10 MHz and the upper 10 MHz sub-bands of the 20 MHz carrier. Terminals with 10 MHz capability camp on either one of the upper or lower sib-bands and receive the respective composite control channel.

Figure 4:
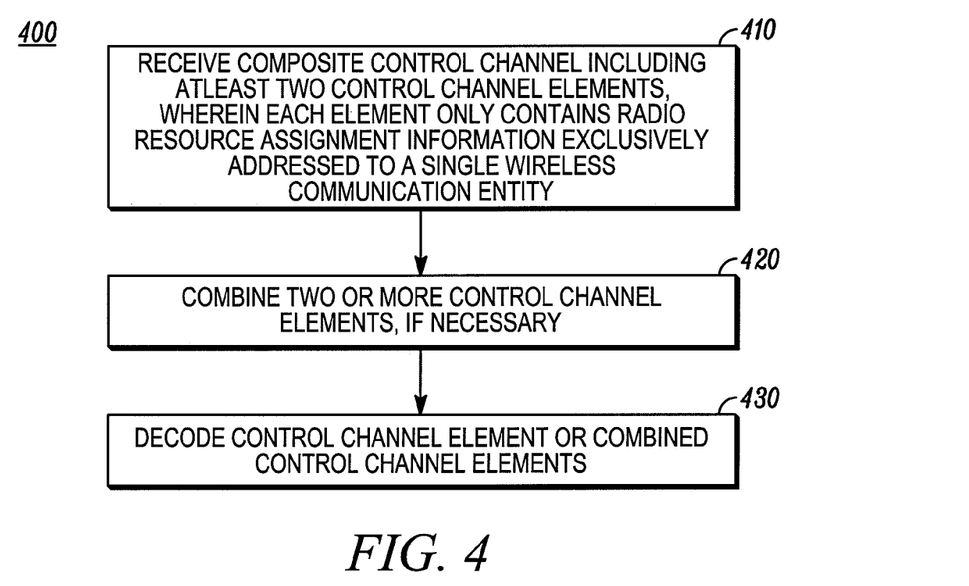
FIG. 4 illustrates a process flow diagram.

In the process 400 of FIG. 4, at 410 a wireless communication entity, for example, the remote unit, receives a composite control channel including at least two control channel elements. In one embodiment, each the control channel element only contains radio resource assignment information exclusively addressed to a single wireless communication entity.

In FIG. 4, at 420, two or more control channel elements are combined before decoding, which occurs at 430. Generally, however, the remote unit may attempt to decode a single control channel element without first combining elements or it may attempt to decode a single control channel element after decoding or attempting to decode combined elements. Whether or not any combining is necessary depends generally on whether the remote unit is successful decoding single control channel elements. Combining may be required, for example, in instances where a cyclic redundancy check (CRC) or some other information verification check fails after decoding a single control channel element, or where decoding is not successful. Information verification typically involves remote unit specific information, which may be included in the decoded control channel element, or masked with the encoded control channel element, or masked or fed into a CRC for CRC color coding.

In some implementations, each of the plurality of control channel elements has an associated root index, which may be used as a basis for combining the control channel elements. For example, if the composite control channel comprises 12 control channel elements, 4 of those elements may have the same associated root index and may be used as the basis for decoding and combining and decoding the control channel elements. In embodiments where the control channel is divided into portions on corresponding center frequencies, as discussed above, the remote unit only combines control channel elements from the same control channel portion. In other words, control channel elements from different control channel portions are not combined.

In some embodiments, the remote unit combines at least two control channel elements of the composite control channel, wherein each control channel element is of the type that contains only radio resource assignment information exclusively addressed to a single wireless communication entity. Combining may be required, for example, in instances where a cyclic redundancy check (CRC) or other information verification check fails after decoding a single control channel element, or instances where decoding is not successful. Generally, however, the remote unit may attempt to decode a control channel element without first combining.

In one embodiment, at least two of the control channel elements are combined by summing soft information derived from first and second codeword information, wherein the first codeword information is within a first control channel element and the second codeword information is within a second control channel element. In such a combination, the combine control channel elements are temporally aligned and superimposed (known as Chase combining). The superposition may involve max-ratio combining, or adding together log-likelihood-ratios (LLRs), or the like. The assumption here is that the first and second codeword information is addressed to the same remote unit. If not, either the decoding or the information verification check after decoding will be unsuccessful. In the case of failure, the remote unit may form a different combination of control channel elements, for example, by combining a different set of control channel elements or by combining an additional element.

In another embodiment, at least two of the control channel elements are combined by rearranging and summing soft information derived from different first and second codeword information, wherein the first codeword information is within a first control channel element and the second codeword information is within a second control channel element. For example, the first codeword and second codeword may comprise subsets of an information set and parity bits generated from a lower rate channel encoder. The subsets may be non-overlapping or partially overlapping. Soft information corresponding to overlapping codeword bit positions is typically summed in the remote unit, while non-overlapping bit positions are typically rearranged to an appropriate position for decoding.

In one embodiment, the remote unit combines the at least two control channel elements according to predefined combinations of control channel elements. For example, at least one of the pre-defined combinations includes a combination of at least two logically contiguous control channel elements. The logically contiguous control channel elements may or may not be physically contiguous. For example, if a set of sub-carriers distributed across frequency (a comb) is used for one control channel element, another control channel element may or may not physically occupy the sub-carriers adjacent to the first control channel element. Or, if the logical and physical orderings of sub-carriers are identical, that is, there is a one-to-one mapping of logical and physical sub-carriers, then logical adjacency implies physical adjacency and vice versa. In other embodiments, at least two non-adjacent control channel elements are combined, wherein the non-adjacent control elements may be physical or logical.

In some implementations, the order in which the remote unit attempts to combine the control channel elements according to the pre-defined combinations is based on one or more hypotheses or assumptions. For example, the control channel elements may be combined based on a determination of the number of control channel elements constituting the composite control channel. Such a determination also includes determining the number of control channel elements constituting a particular type of control channel element in embodiments where the composite control channel includes more than one element type as discussed above. The number of control channel elements may be determined, for example, based on the existence of control channel element number information included in the composite control channel. For example, the number of control channel elements may be determined based on a sequence of bits appended to the composite control channel. In one implementation, different bit sequences are indicative of different numbers of control channel elements. In another implementation, the location of the sequence of bits within the frame is indicative of the number of control channel elements. In this latter implementation, the same bit sequence may be used to indicate different numbers of control channel elements depending on where the bit sequence is located within the frame. The number of control channel elements may also be determined based on data or messaging shared between a wireless communication device and a network infrastructure entity. This may occur in a message sent to all remote units via a broadcast channel sent occasionally or a broadcast message sent in each TTI. The number of control channel elements or subset of control channel elements that the remote unit should decode may also be sent via a message dedicated for that remote unit.

In one embodiment, control channels may be one or two control channel elements, with the size of the control element indicating the type of control element. Convolutional encoding may be used for the control elements. And the decoder may decode the first control element, check the CRC, and then stop decoding if the control element is designated for the user. If not, the decoding may commence from the point just prior to tail bit insertion on the first control element, through the end of the Trellis comprised of both control elements. The CRC is again checked. In this way, control channel decoding may be achieved with less effort than if combined control elements were decoded from the beginning of the Trellis. Note that the code rate for the single and two control elements must be the same in this embodiment.

In some embodiments, a portion of the composite control channel is allocated for assigning radio resources in each frame. In these embodiments, the unallocated portion of the control channel may be used for data transfer. Thus a wireless communication network infrastructure entity, for example, a scheduler, may allocate a portion of the control channel for assigning radio resources in each frame by embedding a bit sequence within the corresponding frame. In one embodiment, the location of the sequence of bits within the frame is indicative of the size of the control channel, for example, how many control channel elements are allocated for assigning radio resources to one or more remote units. In this implementation, the control channel elements may be addressed exclusively to a single remote unit or to more than one remote unit. More generally, the network infrastructure entity may dynamically change the portion of the control channel for assigning radio resources in each frame by changing the bit sequence or the location of the bit sequence embedded in each frame before transmitting the frames. As suggested above, moreover, the network infrastructure entity may also dynamically allocated different types of control channel elements and the number thereof within a frame.

In another embodiment, the bit sequence embedded within the sub-frame is used to identify or indicate that the control channel element is for a remote unit. In this case, the bit sequence embedded within the sub-frame may be a data dependent bit sequence, such as a CRC processed with wireless communication device identification information, the codeword masked with wireless communication device identification information or the like. In this embodiment, a first sub-frame, which may be the last sub-frame of a TTI, contains control information including modulation type, resources, or antenna mode indicator. Each control channel may be one or more control channel elements, and the size of the control channel may be different in the first and second sub-frames. The second sub-frame may occur on the same or different portions of the control channel as the control information from the first sub-frame. If a different portion of the sub-frame is used, blind decoding complexity may be reduced by having the control channel elements in the second sub-frame known from the location of the remote unit's control channel elements from the first sub-frame.

Figure 5:
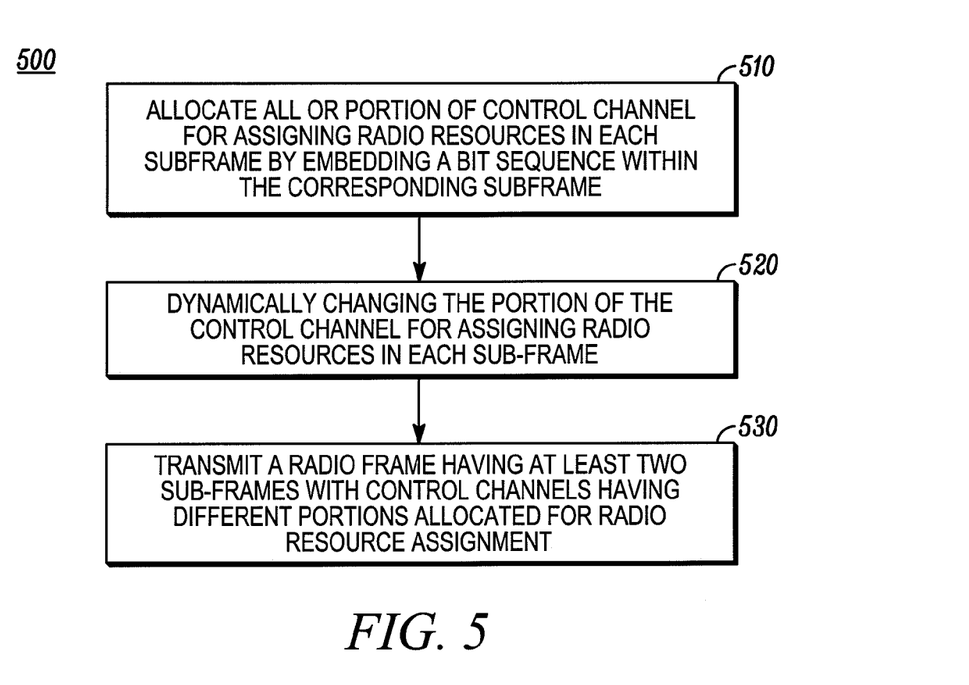
FIG. 5 illustrates another process flow diagram.

In the process diagram 500 of FIG. 5, at 510, the wireless communication network infrastructure entity allocates a portion of the control channel for assigning radio resources in each frame by embedding a bit sequence within the corresponding frame. Allocating a portion of the control channel includes allocating all available portions of the control channel or less than all available portions thereof, wherein the unallocated portion may be used for other purposes, for example, data transfer. At 520, the wireless communication network infrastructure entity dynamically changes the portion of the control channel for assigning radio resources in each frame, wherein multiple frames constitutes a radio frame. According to this aspect of the disclosure, potentially, a different portion of each control channel in each frame, constituting the radio frame, may be allocated to assigning radio resources. The portion of the control channel for assigning radio resources in each frame may be changed dynamically by changing the location of the bit sequence embedded in each frame or by using different bit sequences, as discussed above. At 530, the wireless communication network infrastructure entity transmits at least two frames, for example, constituting a radio frame, wherein each frame includes a control channel having a portion thereof allocated for radio resource assignment.

In FIG. 2, for example, a portion of the control channel used for radio resource assignment is indicated based on where a bit sequence 220, referred to as a terminating marker or signature, is embedded within the corresponding frame. Depending on where the bit sequence is located, the portion of the control channel, e.g., the number of elements, used for radio resource assignment may be less than the entire control channel of the frame. Generally, different frames constituting a radio frame may allocate different portions of the corresponding control channels for radio resource assignment. In one implementation, a wireless communication device, comprises a receiver capable of receiving a frame corresponding to a transmission time interval, wherein the frame includes a control channel and a bit sequence embedded within the frame. A controller communicably coupled to the receiver is configured for determining a portion of the control channel used for radio resource assignment based on where the corresponding bit sequence is embedded within the received frame, wherein the portion of the control channel used for radio resource assignment may be less than the entire control channel.

In the wireless communication device, for example, one of the remote units 101 or 103 in FIG. 1, the device receives a plurality of at least two frames, wherein each frame includes a control channel having at least two control channel elements and each frame includes a bit sequence embedded within the frame. In one embodiment, the wireless communication device determines a portion of the control channel used for radio resource assignment in each frame based on where the corresponding bit sequence is embedded within the frame. Generally, the portion of the control channel used for radio resource assignment may be less than the entire control channel and each frame may use different portions of the control channel for radio resource assignment based upon where the corresponding bit sequence is embedded within the frame.

In some instances, all control channel elements of the composite control channel communicate control channel information. In this particular embodiment, the absence of control channel element number information, e.g., a bit sequence embedded within the frame, is indicative of the use of the full composite control channel for radio resource assignment. For example, in the absence of control channel element number information, the remote unit may assume a default number of control channel elements are used for assigning radio resources.

While the present disclosure and the best modes thereof have been described in a manner establishing possession by the inventors and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication network infrastructure entity, the method comprising:
    transmitting at least two frames, each frame corresponding to a transmission time interval, each frame having a control channel including at least two control channel elements,
    indicating a portion of the control channel allocated for assigning radio resources for at least one of the frames based on a location where a bit sequence is embedded within the at least one frame.

2. The method of claim 1,
    indicating the portion of the control channel for assigning radio resources in each frame includes allocating at least one control channel element of the corresponding frame for assigning radio resources wherein any non-allocated control channel elements are not used for assigning radio resources.

3. The method of claim 1, indicating the portion of the control channel for assigning radio resources in at least one frame by appending the bit sequence after the last control channel element allocated for assigning radio resources.

4. The method of claim 1, indicating different portions of the control channel of the at least two frames allocated for assigning radio resources by embedding the bit sequence at different locations within the corresponding frames.

5. The method of claim 1, dynamically changing the portion of the control channel allocated for assigning radio resources in the at least two frames by changing the location of the bit sequence embedded in the corresponding frames before transmitting the frames.

6. The method of claim 1, for at least one frame, indicating that all control channel elements are used for radio resource assignment by not embedding a bit sequence within the at least one frame.

* * * * *